United States Patent [19]
Lordo et al.

[11] Patent Number: 5,863,316
[45] Date of Patent: Jan. 26, 1999

[54] RECIRCULATING FUME SCRUBBER SYSTEM

[75] Inventors: Richard K. Lordo, West Middlesex; Stephen L. Feldbauer, Jackson Center, both of Pa.; Timothy L. Cox, Weirton, W. Va.

[73] Assignee: Danieli Wean, Division of Danieli Corporation, Youngstown, Ohio

[21] Appl. No.: 897,468

[22] Filed: Jul. 21, 1997

[51] Int. Cl.$^6$ .................................................. B01D 47/00
[52] U.S. Cl. .............................. 95/204; 55/338; 55/340; 95/233; 95/234; 96/257; 96/263
[58] Field of Search ............................ 95/204, 233, 234; 55/338, 339, 340, 220, 224, 226; 96/251, 263

[56] References Cited

U.S. PATENT DOCUMENTS

| | | | |
|---|---|---|---|
| 2,858,903 | 11/1958 | Goetz et al. | 95/204 |
| 2,947,379 | 8/1960 | Aubrey | 95/204 |
| 3,331,187 | 7/1967 | Tsukagoshi | 95/204 |
| 3,443,902 | 5/1969 | Tsao | 95/233 |
| 3,695,004 | 10/1972 | DeLisio et al. | 55/338 |
| 4,473,438 | 9/1984 | Loureiro | 95/204 |
| 5,634,962 | 6/1997 | Trahan et al. | 95/204 |

FOREIGN PATENT DOCUMENTS

| | | | |
|---|---|---|---|
| 3131400 | 2/1983 | Germany | 55/338 |
| 4-290511 | 10/1992 | Japan | 55/338 |

*Primary Examiner*—Duane S. Smith
*Attorney, Agent, or Firm*—Armstrong, Westerman, Hattori, McLeland & Naughton

[57] ABSTRACT

A recirculating fume scrubber system in which fume is evolved from an aqueous bath in a process vessel, such as an HCl pickling tank, and the evolved fume is scrubbed with water and then the scrubbed gas is divided into two portions, one of which is released to a stack vented to atmosphere and the other portion is recirculated to the scrubber.

12 Claims, 6 Drawing Sheets

RECIRCULATING FUME SCRUBBER SYSTEM

BACKGROUND OF THE INVENTION

1. Field of the Invention

This invention relates to a system for recirculating a portion of the fumes evolved from a chemical process and, more particularly, to a metal pickling process evolving fumes, such as hydrogen chloride, in order to improve the cleanliness of fumes exhausted to the atmosphere.

2. Description of the Prior Art

Prior to the present invention, fumes produced in a pickling tank were captured and processed through a scrubbing tower, with water, to remove acid fumes from the transporting air. Such scrubbers have a fixed efficiency (1-fume concentration out/fume concentration in) based on the incoming acid concentration, gas flow through the scrubber, and scrubber water concentration, as well as other scrubber design details. A typical scrubber efficiency is between 90% and 99.5%.

A significant limitation of such systems is that the incoming gas is cleaned to near the same concentration of acid as that in the water in the scrubber so that the scrubber no longer can absorb more fumes, and its efficiency is thus effectively capped. Also, higher scrubber efficiencies require more fresh water which, being contaminated with acid, must be treated for acid removal before disposal.

SUMMARY OF THE INVENTION

Due to increasing environmental requirements, the amount of pollutants,. such as acid fumes from metal pickling processes, which are released through a stack to the atmosphere, must be reduced. The objective of this invention is to provide a scrubber system which will reduce the acid emissions through an exhaust stack, unlimited by the shortcomings of the prior art. To accomplish such objective, a fraction of the scrubbed gas is recirculated back through the scrubber, thereby re-scrubbing the gas. Because the gas now is mixed with the fumes from the process vessel, the concentration of the mixture is high enough that the scrubber can clean it efficiently. In such manner an efficiency over 99% and approaching 100% can be achieved.

DESCRIPTION OF PREFERRED EMBODIMENTS

Figure 1:
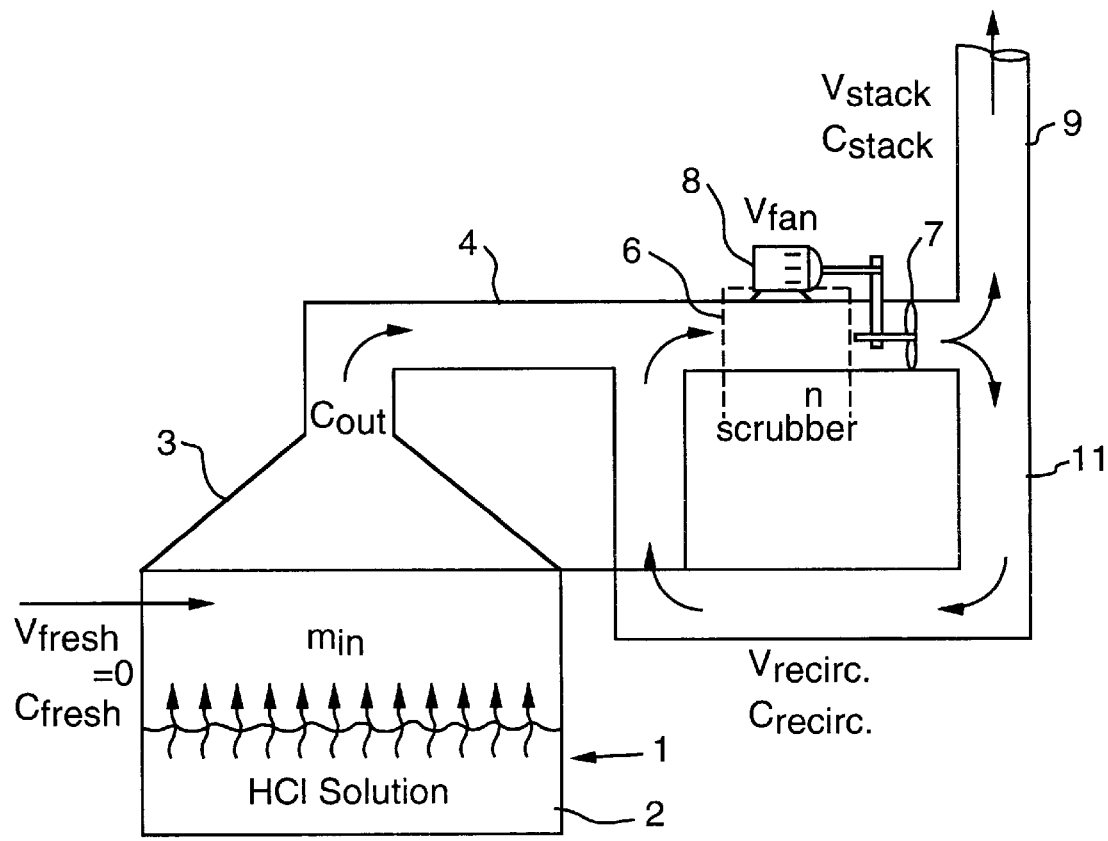
FIG. 1 is a schematic illustration, in elevation, of a recirculating scrubber system of the invention.

Turning first to FIG. 1, that Fig. shows an enclosed process vessel, such as a metal pickling tank, denoted generally by the numeral 1. Vessel 1 contains an aqueous solution 2, e.g. comprising hydrogen chloride and comprises a hood 3. Hood 3 is in communication with a fume exhaust duct 4 connecting with a water scrubber of known design and denoted in dashed outline by the numeral 6. An exhaust fan 7 is disposed in the exhaust duct 4 and is driven by a motor 8. Exhaust duct 4 also communicates with an exhaust stack 9 and a recirculation duct 11 which may introduce recycled gas back into exhaust duct 4, as illustrated in FIG. 1, or back into the enclosed process vessel 1.

Figure 2:
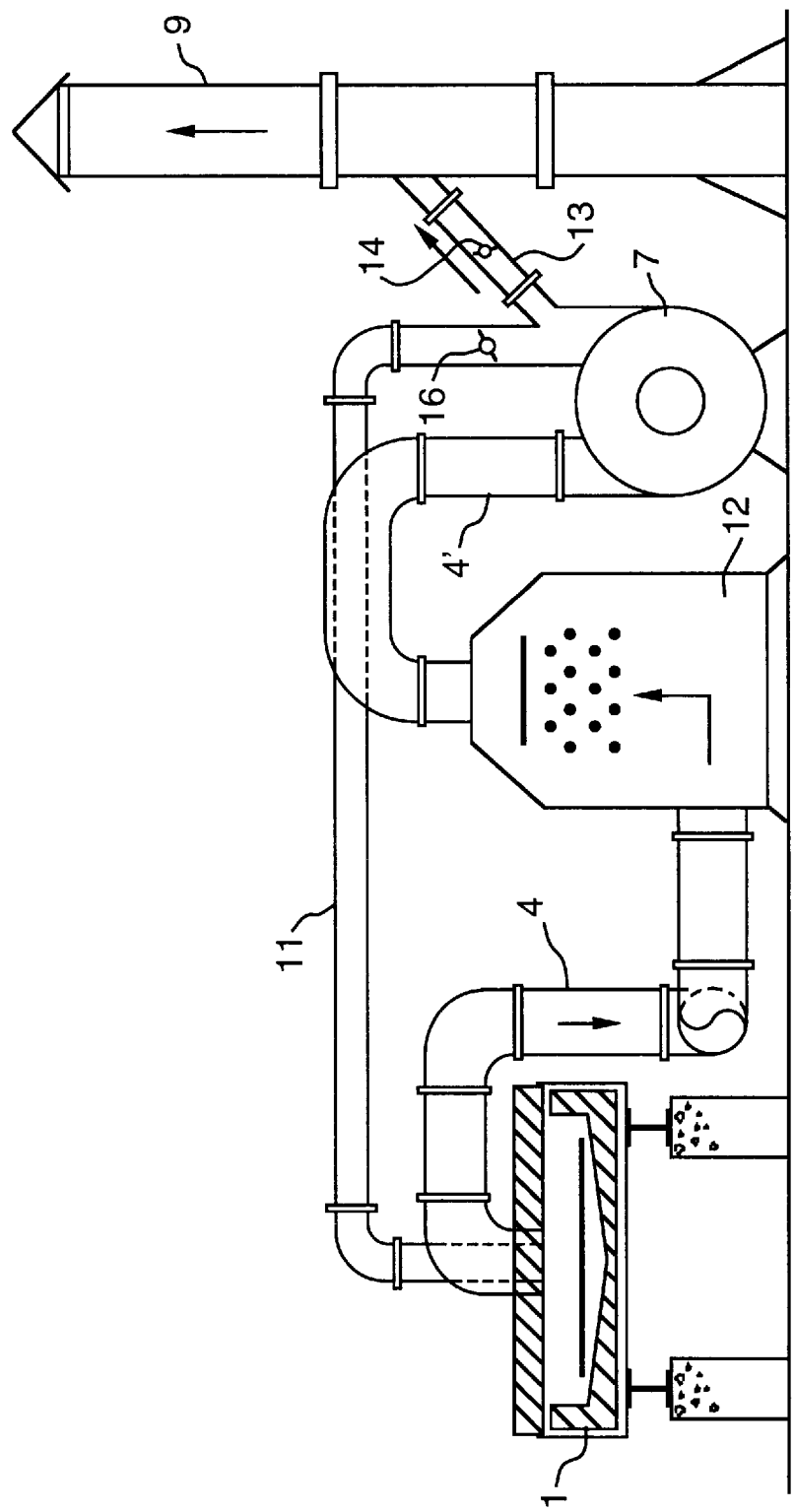
FIG. 2 is an elevational view, in more detail, of a recirculating scrubber system of the invention.

The general principles of the inventive system also are illustrated in FIG. 2, showing a somewhat modified design wherein, e.g. the recycled gas is reintroduced into the process vessel 1 which, in this Fig. is depicted as a metal pickling tank. In the design of FIG. 2, the exhaust duct 4 connects with a collection or holding tank 12 and an extension of the exhaust duct, 4', connects tank 12 to the fan 7. Upon exiting fan 7, the scrubbed gas stream is split into an exhaust portion which enters stack 9 through a pipe 13 having a butterfly valve 14 disposed therein, and a recycled portion enters recirculation duct 11 by means of which the recirculated gas is returned to pickling tank 1. Duct 11 also comprises a butterfly valve 16 which controls the fraction of gas which is recycled, as valve 14 controls the fraction of gas which is exhausted to stack.

The invention is of particular advantage in recirculating a fraction of the scrubbed HCl fume from metal pickling which is exhausted from the discharge stack back through the scrubber to reduce HCl emissions.

By increasing the recirculation rate of the exhaust gas (the percentage of the scrubbed exhaust gas that is returned to the system), the amount of emissions is reduced. For a high efficiency scrubber of 99%+, the reduction in emissions is almost linear with respect to the percent recirculated. Such reduction in emissions is accompanied by increased fan and scrubber capacities. The minimum size of the system is dictated by the amount of flow required to adequately ventilate the pickle line.

An example of how a recirculating system is implemented effectively and at low cost follows, wherein the symbols used also appear in FIG. 1.

The following parameters are assumed:

Steady state m, mass of acid=constant $C_{fresh}$, concentration of acid in gas=0

$V_{in}$, incoming volume flow rate of gas is much less than $V_{fresh}$, $V_{recirc}$ and is equal to or greater than $V_{fan}$ and equivalent to $V_{fresh} + V_{recirc}$ $\eta$ (efficiency)=$1 - C_{stack}/C_{out}$=constant $C_{recirc}$  $C_{stack}$ An enclosed volume of HCl solution loses a quantity of acid through evaporation. Such evaporation reaches relatively high rates from heated HCl pickling solutions. Fresh air is drawn into the enclosed pickling tank through openings above the tank to prevent the vapor from escaping into the atmosphere. This mixture of acid, water vapor, and entrained air is circulated through a water scrubber unit which removes a percentage of acid from the gas, and then exhausts the 'clean' gas through a stack into the atmosphere. According to the invention, stack emissions are reduced by recycling a fraction of the scrubbed gas back into the space above the pickling bath or into the duct exhausting fume from the bath. It is necessary to know the effect of such recycling on the concentration of the gas entering the scrubber, which also influences the emissions. Accordingly, a mass balance was performed, using the above assumptions to qualitatively determine the feasibility of a recirculating gas system.

Mass Balance $V_{fresh} \times C_{fresh}$
mass of acid in fresh air
$+$
$V_{recirc} \times C_{recirc}$
mass of acid in recirculated air
$+$
$m_{in}$ mass of acid generated by evaporation
$=$
$V_{fan} \times C_{out}$
mass of acid drawn out of tank substituting for $V_{fan}$ and $C_{recirc}$, $$V_{recirc} \times (1-\eta) \times C_{out} + m_{in} = (V_{fresh} + V_{recirc}) \times C_{out}$$

solving for $C_{out}$, $$C_{out} = m_{in}/(V_{fresh} + \eta \times V_{recirc})$$

The concentration recirculated back into the tank (and released out the stack) is:

$$C_{recirc} (1-\eta) \times C_{out} = (1-\eta) \times m_{in}/(V_{fresh} + \eta \times V_{recirc}) = C_{stack}$$

For the case of no recirculation, $V_{fan}$ is equivalent to $V_{fresh}$ $$C_{out} = m_{in}/V_{fresh} = m_{in}/V_{fan}$$

and $$C_{stack} = (1-\eta) \times m_{in}/V_{fan}$$

The result shows that there is a steady state equilibrium concentration that is related to the efficiency of the scrubber and the amount of recirculation. For a high efficiency scrubber (e.g. 99.5%) and 50% recirculation, the stack concentration increases only 0.3% over the case of no recirculation, but the volume flow is reduced in half, resulting in nearly 50% less emissions.

The amount of material released out of the stack is the product of the stack concentration and the volumetric flow rate. For the recirculated flow:

$$m_{stack} = (1-\eta) \times m_{in}/(V_{fresh} + \eta \times V_{recirc}) \times (V_{dan-Vrecirc})$$

For straight exhaust:

$$m_{stack} = (1-\eta) \times m_{in}/(V_{fan} \times V_{fan}) = (1-\eta) \times m_{in}$$

The ratio of the amount of material released by recirculation to the amount of material that would be released if there were no recirculation is:

$$\frac{m_{stack\,recirc}}{m_{stack\,nonrecirc}} = \frac{V_{fan} - V_{recirc}}{V_{fresh} + \eta V_{recirc}} = \frac{V_{fresh}}{V_{fresh} + \eta V_{recirc}} = \frac{1}{1 + \eta R)}$$

The parameter R is the recirculation ratio, which is defined as the ratio of the recirculated air flow to the stack flow ($V_{recirc}/V_{fresh}V_{recirc}/V_{stack}$).

It should be noted that the initial concentration does not influence the release efficiency as compared to no recirculation. The efficiency of the system is based only on the amount of recirculation and the efficiency of the scrubber. Thus, for a particular scrubber unit, the emissions reduction is determined solely by the recirculation rate.

The overall system efficiency can be expressed as the amount of incoming contaminant removed by the recirculation before it is released out of the stack:

$$\eta_{overall} = \frac{\eta(1+R)}{1+\eta R}$$

Figure 3:
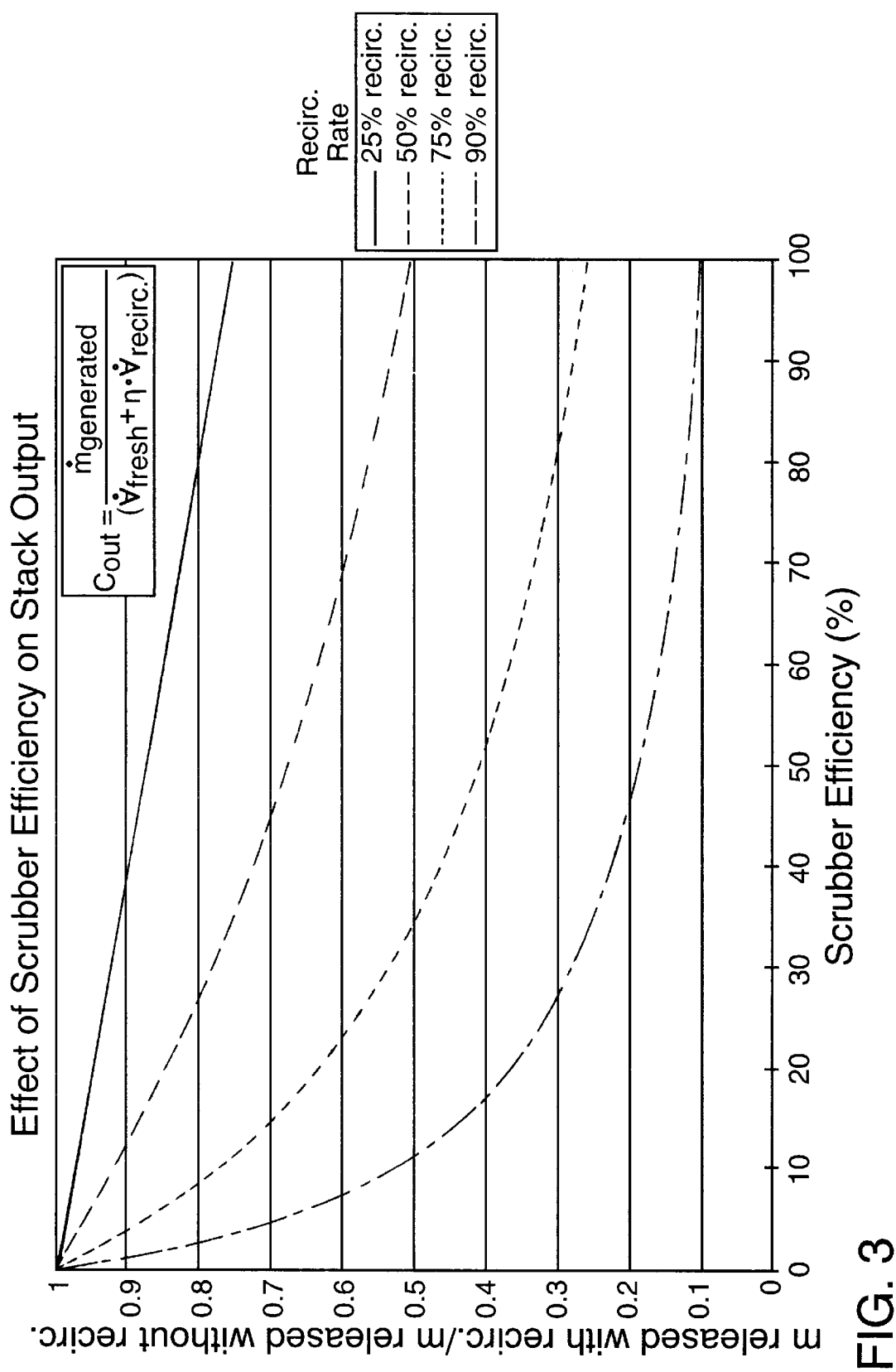
FIG. 3 is a graph showing the ratio of recirculated stack release to the stack release without recirculation, for a constant fan volume system, wherein such ratio is plotted against the scrubber efficiency, in percent.
Figure 4:
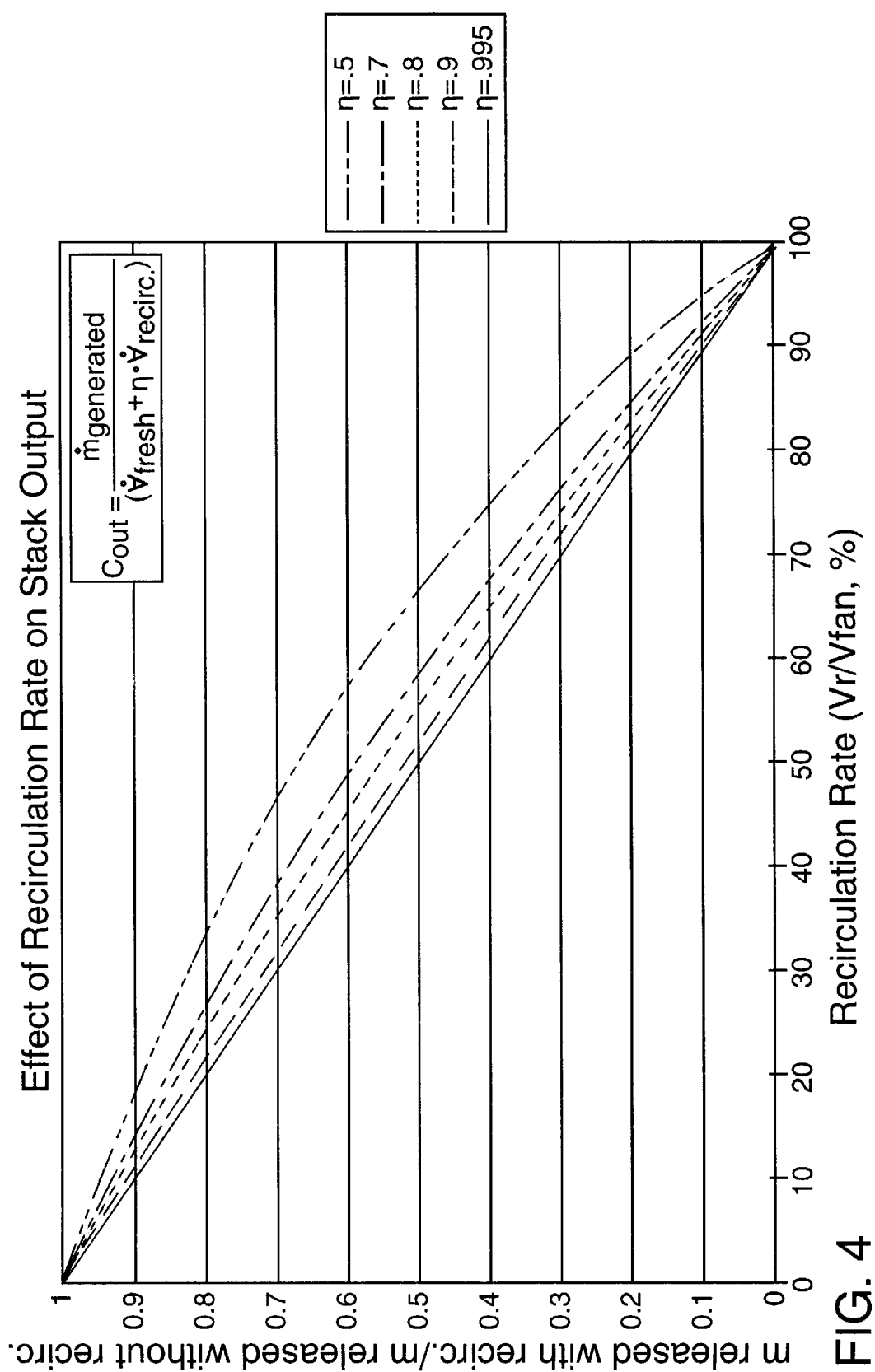
FIG. 4 is a similar graph wherein such ratio is plotted against the gas recirculation rate, recirculating gas volume flow rate vs. the gas volume flow rate of the fan, percent.

FIGS. 3 and 4 show the ratio of the recirculated stack release to the stack release without recirculation for a constant fan volume system. When the recirculation is 100% there are, of course, no emissions from the stack. For a highly efficient scrubber (99.5%), the relation between recirculation rate and release efficiency is nearly linear, i.e. a recirculation of 50% results in a 50% improvement in released material reduction.

FIG. 4 shows the improvement in overall efficiency relative to the recirculation ratio R for a constant stack (or intake) volume. This graph shows that recirculation improves the overall efficiency of the system, although in this Fig. the improvements seems less obvious for the higher scrubber efficiencies.

Figure 5:
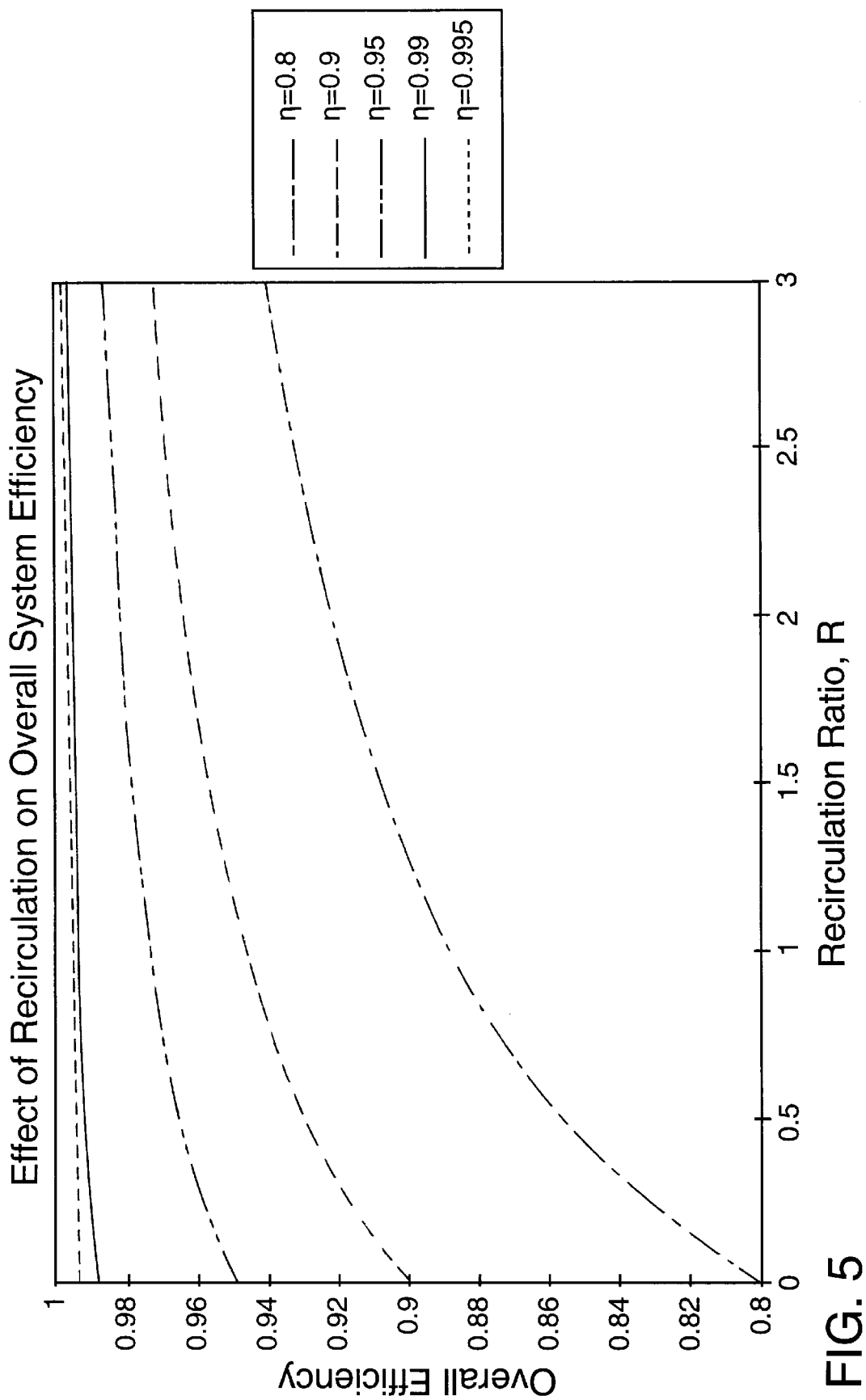
FIG. 5 is a graph of the overall efficiency of the system vs. the recirculation ratio, R.
Figure 6:
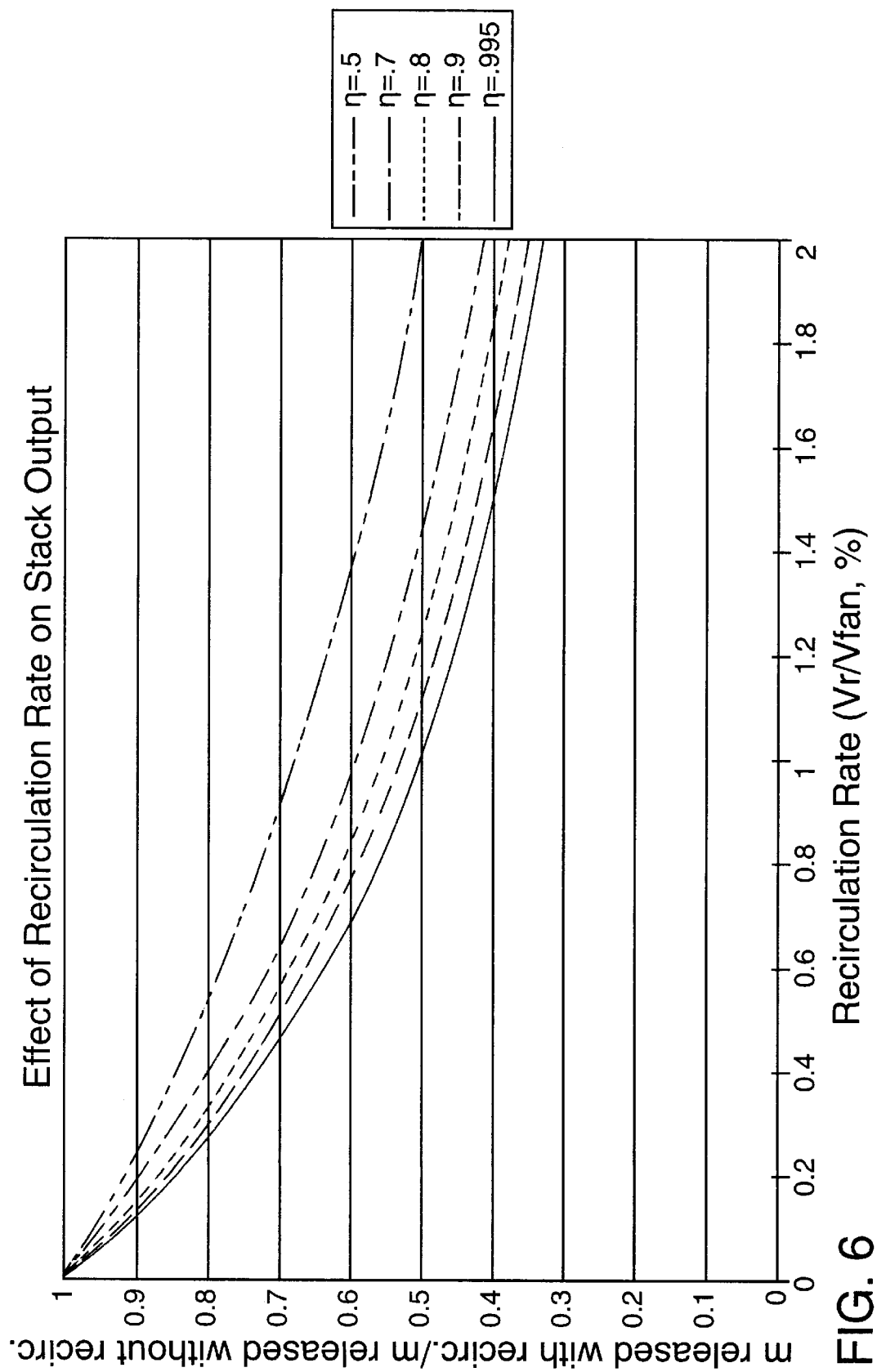
FIG. 6 is a graph of the ratio of mass released with recirculation vs. mass released without recirculation plotted against the recirculation ratio.

FIG. 5 verifies that, although the overall efficiency gain is small if the scrubber efficiency is high, the relative emissions reduction still is quite good.

Based on the foregoing assumptions and calculations, there is no difference between recirculating the gas back to the process tank, as shown in FIG. 2, or in a closed loop at the fan and scrubber, as shown in FIG. 1. The advantages of the latter design are reduced ductwork requirements and a reduced gas flow over the process tank which reduces acid evaporation and pick-up rate, that is less fume is carried away to the scrubber. In any case, the cost of the increased scrubbing comes in the increased fan and scrubber size which is required.

It has been mentioned above that the minimum size of the fume exhaust system is governed by the minimum ventilation requirement to prevent fumes from escaping from the pickling tanks. There are two conditions that must be accounted for in determining this minimum capacity—line run (normal operation), and when the tank covers are open, such as for maintenance. Typically, the second case is a more demanding requirement because opening the covers exposes much larger area through which fumes may escape. Hence the exhaust system must be designed to this requirement, but is much larger than required by normal operation, which occurs most frequently. However, such oversizing may be used to advantage in emissions reduction by allowing recirculation without significantly increasing the size and cost of the fume exhaust system. During line run, the excess capacity of the system included for open cover condition could be recirculated through the scrubber only what is required for ventilation of the tanks is drawn through the system. For example, if the fume system requirement is 12,000 cubic feet per minute (cfm) for open cover condition and 6000 cfm for line run, the system is sized for 12,000 cfm. Then the covers are open, all 12,000 cfm is drawn from the tanks and the recirculating system is shut off. It should be noted that, because of the larger amount of air drawn through the tanks in the open cover condition, the ratio of air to acid fumes is higher, reducing the concentration to the scrubber and reducing emissions. When the covers are closed, the recirculation system is activated; 6000 cfm is drawn from the tanks and 6000 cfm is recirculated (the system size remaining at 12,000 cfm). For a properly applied scrubber, the efficiency is nearly 99%, so, according to FIG. 3, there would be a 50% reduction in emissions.

Although particularly applicable to the water scrubbing of exhaust fume from HCl pickling solutions, the invention is applicable also to fume recycling from other processes involving fume generation and water scrubbing to clean the exhaust gas before release into the atmosphere.

What is claimed is:

1. A fume scrubber system comprising at least one covered process vessel adapted to hold a process mass containing a volatile component comprising an atmospheric pollutant which is released in the form of exhaust gas during operation of the process, a water scrubber for cleaning the exhaust gas, a stack for releasing cleaned exhaust gas to the atmosphere, ductwork connecting the process vessel, the scrubber and the stack, and a fan for transporting the exhaust gas from the process vessel through the ductwork to the scrubber and to the stack, the improvement comprising means to recirculate to the scrubber a portion of the exhaust gas initially passing through the scrubber and prior to release of the remainder of the scrubbed exhaust gas through the stack to the atmosphere, and wherein the gas flow capacity of the system is sufficient to accommodate the gas flow when the process vessel is uncovered.

2. A system according to claim 1, wherein the recirculation means includes a closed loop duct returning a portion of initially scrubbed exhaust gas to the duct intermediate the process vessel and the scrubber.

3. A system according to claim 1, wherein the recirculation means includes a duct to return a portion of initially scrubbed exhaust gas to the covered process vessel.

4. A system according to claim 2, further comprising a butterfly valve in the closed loop to control the amount of initially scrubbed exhaust gas recirculated through the closed loop.

5. A system according to one of claims 1, 2, 3 and 4, wherein the at least one process vessel is an acid metal pickling tank.

6. A system according to one of claims 1, 2, 3 and 4, wherein the at least one process vessel is a hydrogen chloride metal pickling tank.

7. A method of reducing emissions of a fume pollutant component of a covered process vessel exhaust gas stream cleaned by water scrubbing by contact of the exhaust gas with water, comprising recirculating to the scrubber a portion of the initially scrubbed exhaust gas and releasing the remainder of the exhaust gas from a stack to the atmosphere, sizing the gas flow rate capacity of the scrubber such that it can accommodate the gas flow rate when the process vessel is uncovered, uncovering the process vessel and stopping the recirculation of exhaust gas, then covering the process vessel and commencing the recirculation of exhaust gas.

8. A method according to claim 7, wherein the recirculated portion of the initially scrubbed exhaust gas is recirculated to a position immediately upstream of the scrubber.

9. A method according to claim 7, wherein the recirculated portion of the initially scrubbed exhaust gas is recirculated to a location between the process vessel and the scrubber.

10. A method according to claim 7, wherein the recirculated portion of the initially scrubbed exhaust gas is recirculated to the covered process vessel.

11. A method according to one of claims 7 to 10, wherein the process vessel is an acid pickling tank.

12. A method according to one of claims 7 to 10, wherein the process vessel is a hydrogen chloride pickling tank.

* * * * *